March 29, 1927.
W. F. MESCHENMOSER
1,622,333
CASING FOR ELECTRICAL FITTINGS
Filed Feb. 24, 1925
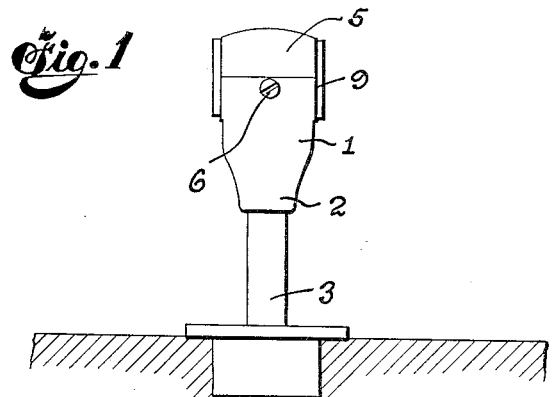
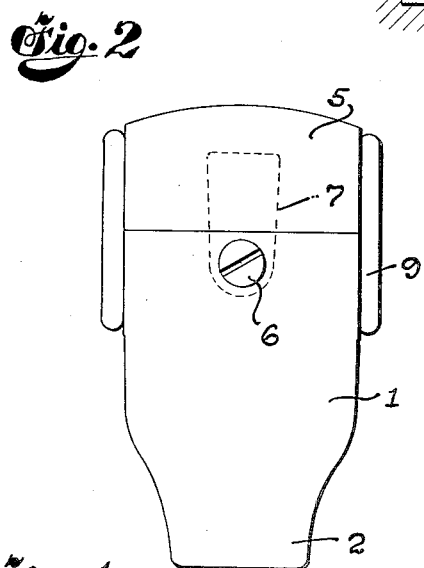
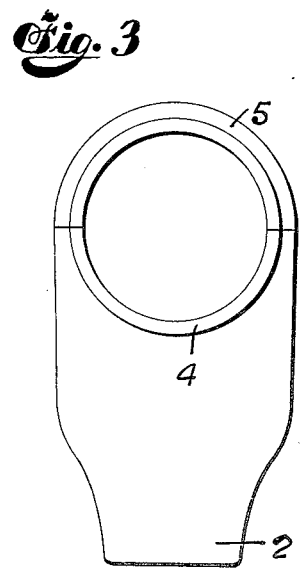
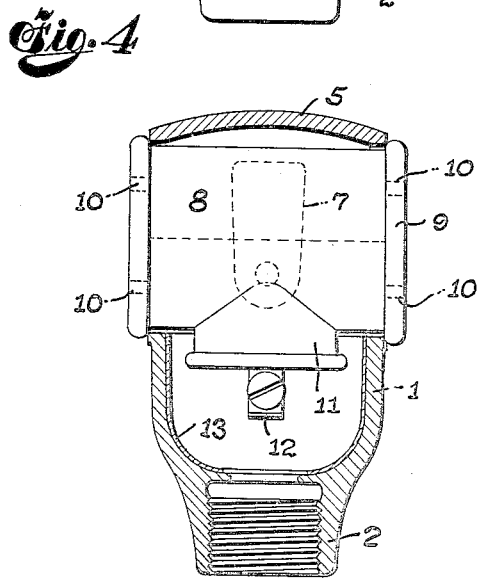
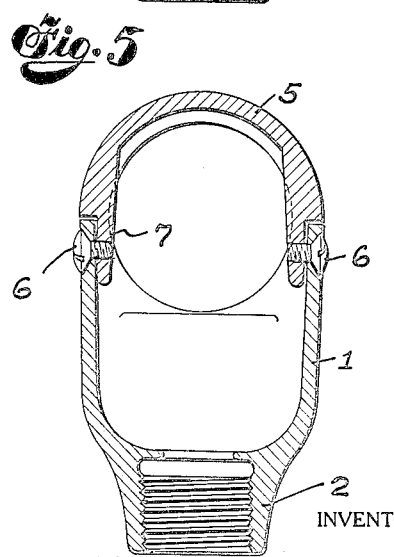
INVENTOR
William F. Meschenmoser.
BY
Townsend & Decker
ATTORNEYS.

Patented Mar. 29, 1927.

1,622,333

UNITED STATES PATENT OFFICE.

WILLIAM F. MESCHENMOSER, OF NEW DORP, NEW YORK; JULIA JEANETTE MESCHENMOSER, EXECUTRIX OF SAID WILLIAM F. MESCHENMOSER, DECEASED, ASSIGNOR TO RUSSELL & STOLL COMPANY, OF NEW YORK, N. Y., A CORPORATION OF NEW YORK.

CASING FOR ELECTRICAL FITTINGS.

Application filed February 24, 1925. Serial No. 11,039.

This invention relates to casings adapted to hold an electrical fitting and which may be detachably connected to a floor outlet or pipe into which the wire main leads.

The principal object of the invention is the production of a casing of the above-character which shall be of simple construction and which shall firmly support and protect the fitting without danger of short-circuiting.

Other objects and advantages of the invention will appear from the accompanying description, the invention consisting in the novel casing hereinafter more particularly described and then specified in the claims.

In the accompanying drawing illustrating a practical embodiment of the invention:

Fig. 1 is a front elevation of the invention showing it connected to a floor outlet.

Fig. 2 is a front elevation of the device showing it supporting the electrical fitting.

Fig. 3 is a side elevation of the casing.

Fig. 4 is a transverse section taken therethrough showing the fitting in elevation.

Fig. 5 is a vertical section taken through the casing.

Referring in detail to the several figures of the drawing:

1 indicates the hollow body of the casing which tapers inwardly at its lower end as indicated to form an interiorly screw-threaded nipple 2 adapted to be screwed on a floor outlet or pipe 3 into which a wire main leads. The body 1 is provided with an open upper portion or top as indicated and is curved downwardly at opposite sides as at 4 to form the lower semi-circular walls of round openings, the upper semi-circular wall of which constitutes a cover plate 5 adapted to seat on the upper edge of the body and to be detachably secured to said body by screws 6 passing through the wall of the body and through screw-threaded openings in ears 7 which are integral with the cover plate.

8 indicates the insulating body of a cylindrically-shaped electrical fitting provided with flanges 9 at either end thereof and with openings or slots 10 in its end walls adapted to receive the jacks of a detachable plug whereby electrical connection may be made with said fitting from either end thereof. The body of the fitting is also provided with a downwardly depending extension 11 preferably integral therewith which is provided with or carries the usual binding posts 12 whereby connection may be made with the wire main leads which are brought upwardly through the pipe 3, nipple 2 and into the body 1. I also prefer to provide an insulating sleeve or lining 13 fitting snugly within the body 1 to obviate any possibility of short-circuiting.

For mounting the fitting in position in the casing the cover plate 5 is removed and the body of the fitting is seated on the semi-circular wall 4 after which the cover plate is again secured to the body of the casing. When in this position the binding posts extend downwardly in the hollow body and no parts of the fitting are exposed to view excepting the end walls thereof. The flanges 9 also act as stops to prevent longitudinal movement of the fitting in the openings formed by semi-circular wall 4 and the semi-circular cover plate and to prevent removal of the fitting through said openings without first removing the cover plate.

What I claim as my invention is:—

1. In combination with an electrical fitting having a body with binding posts extending downwardly therefrom and provided with end walls each having openings therein for receiving the jacks of a plug, of a casing for receiving and holding said fitting, said casing comprising a hollow body part and a detachable cover, said casing having annular openings receiving and supporting the body of the fitting with the ends thereof only exposed to view and the binding posts extending into the body of the casing, said detachable cover engaging said fitting for holding the latter in said body part and cover and having portions forming parts of the walls of said annular openings.

2. In combination with an electrical fitting of the cylindrical type which is provided with end flanges and with openings in the end walls thereof for receiving the jacks of a plug, of a casing comprising a hollow body connected to a conduit and having a pair of openings receiving and supporting the fitting with said flanges outside of said body and acting to prevent longitudinal movement of the fitting through said openings in either direction by engagement with said body, said casing embodying a removable cover plate permitting removal of said fitting therefrom.

Signed at New York, in the county of New York and State of New York this 21st day of February, A. D. 1925.

WILLIAM F. MESCHENMOSER.